United States Patent [19]

May et al.

[11] Patent Number: 5,327,127
[45] Date of Patent: Jul. 5, 1994

[54] MESSAGE ENCODING WHICH UTILIZES CONTROL CODES AND DATA CODES

[75] Inventors: Michael D. May; Brian J. Parsons; Peter W. Thompson; Christopher P. H. Walker, all of Bristol, United Kingdom

[73] Assignee: Inmos Limited, Bristol, England

[21] Appl. No.: 870,393

[22] Filed: Apr. 17, 1992

Related U.S. Application Data

[62] Division of Ser. No. 546,092, Jun. 29, 1990, Pat. No. 5,130,977, and Ser. No. 546,402, Jun. 29, 1990, Pat. No. 5,140,583.

[30] Foreign Application Priority Data

Jun. 30, 1989 [GB] United Kingdom ............... 8915135
Jun. 30, 1989 [GB] United Kingdom ............... 8915137

[51] Int. Cl.$^5$ ............................................. H03M 7/20
[52] U.S. Cl. ............................................. 341/102; 370/60
[58] Field of Search ............... 341/102, 59, 70, 58; 70/60, 94.1, 58.2

[56] References Cited

U.S. PATENT DOCUMENTS

| | | | |
|---|---|---|---|
| 4,486,739 | 12/1984 | Franaszek et al. | 341/59 |
| 4,603,416 | 7/1986 | Servel et al. | 370/60 |
| 4,651,318 | 3/1987 | Luderer | 370/60 |
| 4,661,947 | 4/1987 | Lea et al. | 370/60 |
| 4,665,517 | 5/1987 | Widmer | 370/86 |
| 4,679,189 | 7/1987 | Olson et al. | 370/60 |
| 4,682,283 | 7/1987 | Robb | 364/200 |
| 4,692,917 | 9/1987 | Fujioka | 370/60 |
| 4,742,511 | 5/1988 | Johnson | 370/94.1 |
| 4,780,318 | 10/1988 | McHarg et al. | 370/60 |
| 4,813,038 | 3/1989 | Lee | 370/60 |
| 4,937,817 | 6/1990 | Lin | 370/60 |
| 4,947,388 | 8/1990 | Kuwahara et al. | 370/94.1 |
| 4,965,788 | 10/1990 | Newman | 370/94.1 |
| 5,130,977 | 7/1992 | May et al. | 370/60 |
| 5,140,583 | 8/1992 | May et al. | 370/60 |

FOREIGN PATENT DOCUMENTS

| | | |
|---|---|---|
| 0066512 | 12/1982 | European Pat. Off. . |
| 0147677 | 7/1985 | European Pat. Off. ...... H04L 25/49 |
| 0274709 | 7/1988 | European Pat. Off. . |
| 929336 | 6/1963 | United Kingdom . |
| 2001789A | 2/1979 | United Kingdom . |

OTHER PUBLICATIONS

"Deadlock-Free Message Routing in Multiprocessor Interconnection Networks", IEEETC, vol. C-36, No. 5, May 1987.
"High Performance Wide-Area Packet Switched Network Using Optical Fibers", IEEE PRCC, Comp. and Sig. Proc., Jun. 1987.
IBM Technical Disclosure Bulletin, vol. 22, No. 8B, Jan. 1980, pp. 3547-3550, L. Balliet et al.: "Four/six--block transmission code".

Primary Examiner—Brian K. Young
Attorney, Agent, or Firm—Edward D. Manzo

[57] ABSTRACT

A method of encoding data for transmission between computer devices is disclosed in which data is encoded into a plurality of sequences, each sequence containing an equal number of ones and zeros and being of a predetermined bit length. There is a finite set of the permutations of equal numbers of ones and zeros in that predetermined bit length. One subset of the finite set is selected for use as data codes and a second subset is selected for use as control codes.

10 Claims, 8 Drawing Sheets

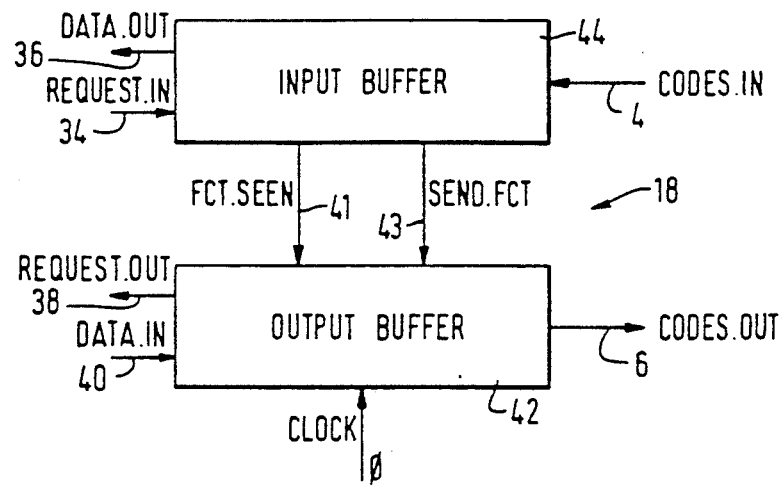
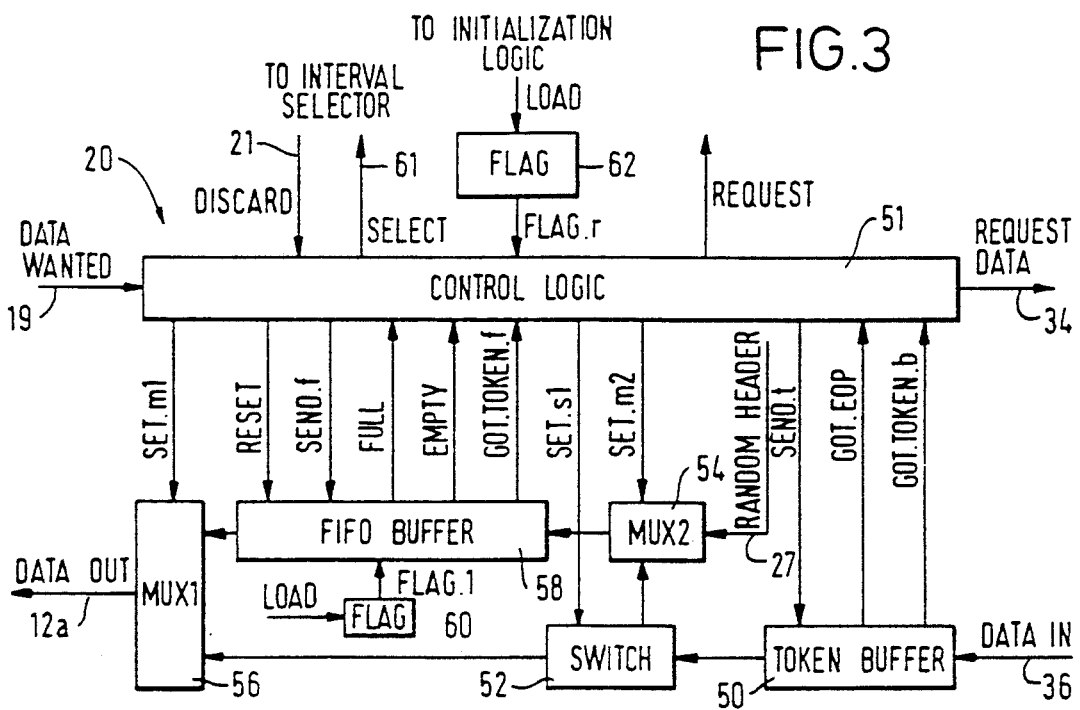

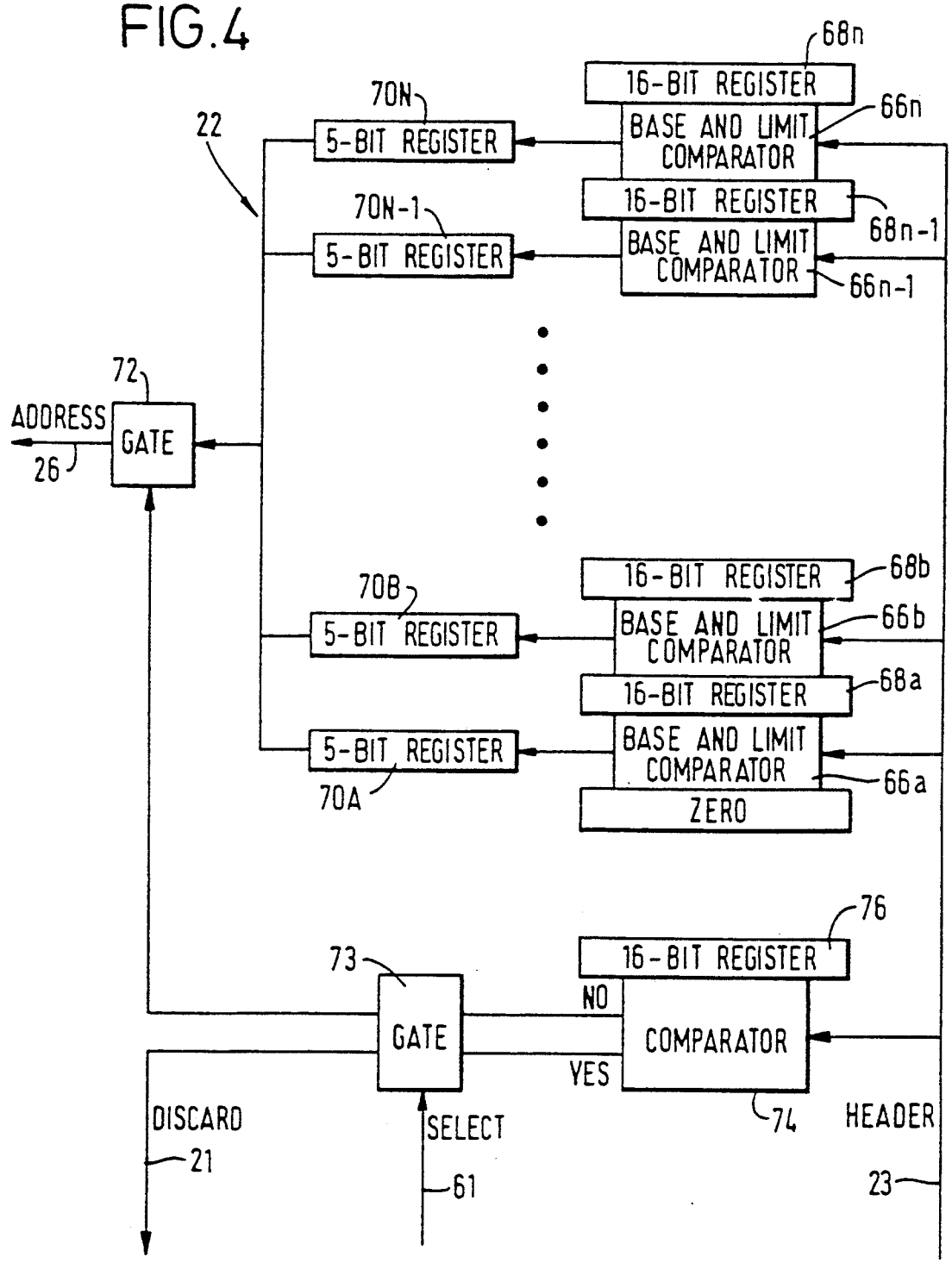

MESSAGE ENCODING WHICH UTILIZES CONTROL CODES AND DATA CODES

RELATED APPLICATIONS

This application is a divisional from U.S. application Ser. No. 546,092 and 54640 filed Jun. 29, 1990 (issued as U.S. Pat. Nos. 5,130,977 and 5,140,583, respectively)

FIELD OF THE INVENTION

This invention relates to message encoding, and particularly to a method of encoding messages to be routed in a computer network.

BACKGROUND TO THE INVENTION

It is frequently desired to connect processing devices such as microcomputers in a network so that one microcomputer can communicate with others in the network. In such networks it is unduly restrictive if a microcomputer can communicate only with its immediate neighbours, i.e. those devices hardwired to it. It is currently known for microcomputers in a network to be capable of executing a process whose function is to route messages through the network. That is, the process would receive a message and execute an instruction the effect of which would be to pass the message to the appropriate neighbouring microcomputer where it might be required to repeat the procedure. This is costly both in terms of process execution time on the microcomputer and in terms of the work required to allocate processes of a program to different microcomputers in a particular network format.

Message routing devices of various kinds are known. Some are specific to a particular network format while others operate by providing switched channels between processing devices connected to the routing device.

SUMMARY OF THE INVENTION

In one aspect, the present invention is directed to a way of encoding data to form message packets for transmission in a computer network.

According to one aspect of the invention there is provided a method of encoding data for transmission in bit sequences in which method each sequence contains an equal number of ones and zeros, said sequences being of a predetermined bit length and forming a finite set of the permutations of equal numbers of ones and zeros, wherein a first subset of said finite set is selected for use as data codes and a second, distinct subset of said finite set is selected for use as control codes for controlling the transmission of said data codes, one of said control codes comprising a flow control code for controlling the quantity of data codes transmitted between a source device and a destination device.

The invention also provides a message packet coding scheme which method comprises forming bit packets which are six bits long, each packet containing three ones and three zeros, sixteen combinations of which are taken to represent different values of four bits of data, one combination is used to represent the end of message packets and one combination is used to control the flow of data codes and end of packet codes in the opposite direction.

The aspects of the invention are particularly, but not exclusively, applicable to encoding data for transmission in networks of intercommunicating microcomputers with other devices. It is particularly applicable to the communication between devices which are coupled by pairs of unidirectional communication lines along which bit packets are transmitted serially such that one particular bit packet (referred to hereinafter as the flow control token) is transmitted to control the quantity of other bit packets transmitted along the other communications line. It is particularly, but not exclusively, applicable to the communication between devices which transmit sequences of bytes of data as sequences of bit packets followed by a particular bit packet which is an end of sequence marker. It is particularly applicable to the communication between more than two devices which transmit sequences of bytes of data as sequences of bit packets in which the first one or several bytes of each sequence is the header portion. Such communication systems are described in our copending Patent Application No. 546,589 (Page White Farrer Ref. 66588), the contents of which are herein incorporated by reference.

Aspects of the invention are particularly useful for routing messages through a network of routing switches, each switch having a plurality of inputs at which messages are received and a plurality of outputs, one of which is selected according to the destination of the message. Preferably each output is selectable for a range of destination node identifications. This is termed herein "interval labelling". It enables header reading circuitry of the routing switch to adopt a very simple form, for example to include a small look up table having a number of registers equal to the number of switch outputs, which can operate quickly. All that is required is to determine the range within which the destination node identified by the header portion falls. Since the header reading circuitry can be small, it is possible to duplicate it several times on chip so that for a routing switch with several inputs there may be header reading circuitry associated with each input or with each group of a small number of inputs. This removes a bottleneck which would otherwise reduce the efficiency of the routing device in the case that packets arrive on several inputs simultaneously.

Although "interval labelling" schemes exist in theory, problems arise in that interval labelling schemes do not permit arbitrary message routes through a network nor do they allow a message to be transmitted efficiently through a series of connected networks: the route is predetermined by the node indicator and the interval selection algorithm used in the reading circuitry, which is specific to each network.

These problems are solved in accordance with one aspect of the present invention by providing in the routing switch deletion circuitry which can be set to delete the node indicator of the packet just before it is transmitted.

For routing in a network having a plurality of nodes of respective identifications, each message packet can comprise a node indicator to indicate its destination. A message packet can be dispatched with two node indicators through a computer network having a succession of routing switches. In this case, the first node indicator can be "used up" in a first routing switch which has deletion circuitry set to delete the first node indicator and the second node indicator will be used at the succeeding routing switch to which it has been sent by the first node indicator. This enables connections of networks of routing switches and processing devices to be made to each other thereby giving considerable flexibility to network formats. It also means that, as a node indicator is only required to direct the message through one routing switch, it need only contain sufficient information to identify the output of that routing switch and can hence be short. Not only does this enable the interval selection algorithm to operate quickly to decode the indicator, it also means that the transmission time for the node indicator is minimised.

The encoding method is particularly useful for messages to be routed between a first computer device at a source node and a second computer device at a destination node in which each packet output by the source node is acknowledged by the destination node when that packet is received thereby. To this end the packet generating circuitry of the computer devices is capable of generating an acknowledgement packet on receipt of a data packet. In this regard reference is made to our copending Application No. 546,589 (Page White & Farrer Ref: 66588), the contents of which are hereby incorporated by reference, which describes computer devices for forming computer networks to which this invention is particularly applicable. The data packets and acknowledgement packets form the basis of synchronised process to process communication between processes executed by processors on remote computer devices.

By synchronised process to process communication is meant that the communicating processes are at corresponding program stages when message transmission is effected. A message could comprise a plurality of the aforementioned data packets.

The present invention also enables messages to be routed randomly through a network. It can be shown in theory that the random direction of messages through a network relieves otherwise overworked hardwired connections between devices.

For a better understanding of the present invention and to show how the same may be carried into effect, reference will now be made, by way of example, to the accompanying drawings:

BRIEF DESCRIPTION OF THE DRAWINGS

FIG. 2 is a block diagram of a communications device of the routing switch;

FIG. 3 is a block diagram of the header portion buffer of the routing switch;

FIG. 4 is a block diagram of the header reading circuitry of the routing switch;

DESCRIPTION OF THE PREFERRED EMBODIMENT

Figure 1:
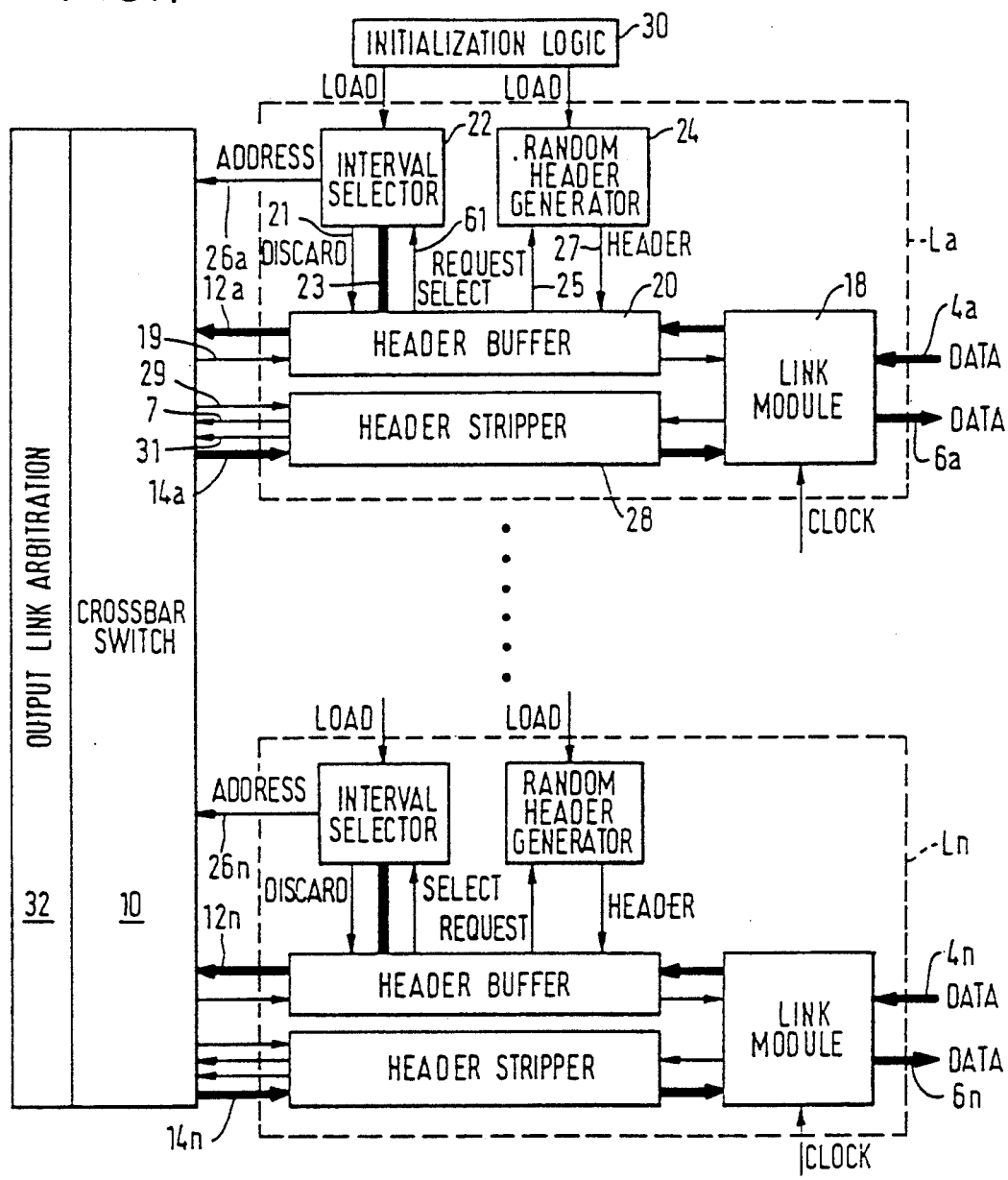
FIG. 1 is a block diagram of a routing switch.

FIG. 1 shows the basic constructional features of a routing switch 1 in accordance with a preferred-embodiment of the invention. In FIG. 1, heavy arrows designate data paths while lighter arrows indicate instruction paths. The routing switch includes switch circuitry in the form of a crossbar switch 10 in which any one of a plurality of message inputs 12a ... 12n can be connected to any one of a plurality of message outputs 14a ... 14n. In the preferred embodiment there are 32 inputs and 32 outputs, paired to form 32 message links. The crossbar switch has output link arbitration circuitry 32 which prevents more than one input being connected to each output at any one time. For the sake of clarity only two links are shown, designated La, Ln, indicated by a broken line surrounding the components of the link. The following description relates to link La, but all the other links are identical subject to the possible sharing of some of their components as discussed later.

The link La includes a communications device referred to herein as a link module 18 which serves to connect the routing switch to another similar routing switch or to any other device and arranged for receiving and sending message packets to and from the routing switch. This connection is achieved by a bidirectional pair of unidirectional channels 4a, 6a. Each message packet is in a serial data format and includes a header identifying the destination node of the packet. A destination or source node in a computer network is generally but not always a computer device capable of executing processes.

Serial Data Format

The data format used herein for the link modules is termed "clock-with-data" encoding. By sending three zero bits and three one bits in each six-bit period, DC-balance is preserved, and the clock signal can be extracted using a phase-locked loop. This technique is called 3-out-of-6 coding There are 20 distinct 3-out-of-6 codes. In order to transmit bytes of data efficiently, 16 of these codes are assigned to represent the different possible values of a nibble (4 bits). Thus a byte can be sent in two codes. Where transmission must be continuous (for example in a phase-locked loop system), it is necessary to have a single null code which is transmitted when no other code can be transmitted.

If a message packet is sent directly from a source device to a destination device it is not necessary for the length of the packet to be represented within the packet; it is only necessary to ensure that the source device and destination device agree on the length. However, where packets pass through routing switches, it must be possible for these routing switches to determine the length of the packet passing through so that the (temporarily connected) route through the switch circuitry 10 can be disconnected as the end of the packet is output. Unless every packet is the same length, this requires that the protocol provides an indication of the packet length, either by a termination marker or an initial length count. The introduction of an initial length count increases the packet delay through the routing switch and also requires logic to count through the packet. A better technique is therefore to reserve a control token as the end-of-packet marker.

The complete protocol for a 3-out-of-6 coding system is therefore as shown in the following table. Exactly which bit-patterns correspond to which tokens is entirely arbitrary, and so is not shown.

| | |
|---|---|
| 16 | data values |
| 1 | flow-control token (FCT) |
| 1 | end-of-packet token (EOP) |
| 1 | null token (NULL) |
| 1 | unassigned |

Referring to FIG. 2, the link module is connected to a header buffer 20 by an input data path 36 and an output instruction path 34. The link module is also connected to a header stripper 28 by an output data path 40 and an input instruction path 38. The header buffer 20 can communicate with header reading circuitry in the form of an interval selector 22 via Discard and Select paths 21, 61, and is permanently connected to the interval selector 22 via a Header connection 23. The interval selector 22 reads the header portion of an incoming packet, determines therefrom the output of the switch circuit 10 to which the message should be directed and sets the switch circuitry 10 accordingly. To this end, an instruction Address path 26 permits the interval selector 22 to communicate with the switch circuitry 10. The switch circuitry can transmit instructions to the header buffer via path 19. The header buffer 20 can also communicate with a random header generator 24 via Request and Header paths 25, 27 for a purpose which will be described hereinafter. A message packet is output from the switch via the header stripper 28, the purpose of which will also be described hereinafter. The header stripper can transmit instructions to and from the switch circuitry 10 via paths 29, 31, 7. Reference numeral 30 designates initialisation circuitry used to set up the routing switch for operation. The operation of each component of the routing switch will now be described.

It will be appreciated that the necessity to transmit a packet header before each block of data reduces the effective time available for the transmission of data and hence reduces the effective data bandwidth. Thus it is desirable to make the packet headers as short as possible. However it is also desirable to be able to specify any one of a large number of terminal links of a network in the case that a large network is required. To this end the present invention allows for the size of packet headers to be varied, so that they may be sufficiently large to allow all the terminal links of a large network to be specified, or in the case of a small network may be made smaller to reduce the diminuation of the effective data bandwidth. In the preferred embodiment each routing device contains a flag which determines whether packet headers are one or two bytes in length. One byte is the shortest size of header which does not disturb the view of packets as consisting of a sequence of bytes, and two bytes is sufficient to enable 65,536 terminal links to be distinguished.

Link modules and their flow-control mechanism

Each link module 18 accepts requests for data from the header buffer 20 along path 34, and subsequently supplies data along path 36. It also makes requests for data from the header stripper 28 along path 38 and subsequently receives data along path 40. It is important that flow control is maintained between the routing switch and a device connected thereto by the link module. To do this the link module 18 multiplexes flow-control information into data streams between the routing switch and a device connected thereto. To do this without consuming too much of the bandwidth, in order to maximise the rate of transmission of data, the link modules control the flow of data items in batches rather than individually. To this end each link module includes a buffer large enough to hold a complete batch of data items, and is capable of counting how many data items remain both to be sent and to be received. In accordance with one aspect of the present invention the flow of blocks of data is regulated by reserving as a flow-control token a particular code from the set of codes which the link module 18 may transmit and receive.

A flow-control token is transmitted whenever the link module 18 of the routing switch has sufficient buffer space for an entire batch of data.

The link modules regulate the flow of data items without regard to the packets which they may constitute. At any instant, the data items buffered by a link module may form part or all of one or more consecutive packets.

Referring now to FIG. 2, each link module comprises: an output buffer 42 which converts data items and flow-control information into the serial format used for transmission, and transmits them at a frequency determined by a clock signal o; and an input buffer 44, which decodes the serial format into data items, which it stores, and flow-control information, which it transmits to the output buffer 42.

The unit of flow control is a flow control batch. Each batch of data consists of a plurality of codes, where each code represents either four bits of data or is an end-of-packet code. For example, the flow control batch could consist of sixteen codes.

Each link module connected to a separate device which has its own link module or similar communicating device maintains a count of the number of data items that it may send to the other link module without receiving any further flow-control information. This count is called the credit. Each link of a connected pair of link modules maintains a count of the number of data items that it may be sent by the other link module without sending any further flow-control information. This count is called the debit.

Each link of a connected pair of link modules indicates that it is prepared to receive another batch of data items by sending a flow-control token. When it does so it increases its debit by the number of data items in a batch. When the other link of the pair receives the flow-control token it increases its credit by the number of data items in a batch.

The flow-control mechanism of the link modules will now be explained with reference to FIG. 2, using the serial data format described above.

Whenever the input buffer 44 receives on channel 4 and decodes a flow-control token it signals the output buffer on the path 41 called fct.seen. Whenever the output buffer receives a signal on the path 41 fct.seen it increments its count of the number of codes still to be transmitted (its credit), by the size of the flow-control batch.

The input buffer 44 maintains a count of the number of codes to be received before the credit of the connected link module of the separate device is exhausted. This count should be the same as the corresponding credit in the output buffer of the connected link module of the separate device connected to the routing switch, apart from discrepancies caused by codes in transit between the two link modules.

The input buffer 44 contains a first-in, first-out buffer (FIFO) which can buffer at least as many codes as are contained in a flow-control batch. Codes other than null codes and flow-control tokens are stored in the buffer, and a count is maintained of the number of codes in the buffer. When a signal is received on the path 34 called request.in the input buffer 44 removes the first element from the FIFO and sends it on the path 36 called data.out, and decrements the count of the number of codes stored in the FIFO, unless there are no codes in the FIFO, in which case it sends the first code it receives, other than null codes and flow-control tokens, directly on the path data.out.

Whenever the sum of the number of codes in the input buffer 44 and the number of codes to be received before the current flow-control batch is exhausted (the debit) is less than the difference between the size of the buffer and the size of a flow-control batch, the input buffer 44 signals the output buffer 42 on the path 43 called fct.request. The output buffer then sends a flow-control token at the first opportunity.

It will be appreciated that if the size of the input buffer FIFO is exactly equal to the size of the flow-control batch, the input buffer will signal the output buffer to send a flow-control token only when the input buffer FIFO is completely empty and the current flow-control batch is completely exhausted. For this reason it is advantageous to make the input buffer FIFO somewhat larger in capacity than the size of the flow-control batch, in order that the flow of data does not stall.

There now follow descriptions of the input and output buffers in the OCCAM 2 language. In these descriptions codes are represented by bytes, and signals are represented by channels carrying boolean values only. The OCCAM language is described in The OCCAM 2 Reference Manual, which is hereby incorporated by reference.

In OCCAM 2, the link module 18 is represented by the parallel composition of the input and output buffers 44, 42. The paths leaving and entering the module are assumed to be defined in a wider scope. Then the link module is represented by:

```
CHAN OF BOOL fct.seen, send.fct, fct.sent:
PAR
    OutputBuffer (clock.in, codes.out, data.in, request.out,
        fct.seen, send.fct, fct.sent)
    InputBuffer (codes.in, data.out, request.in, fct.seen,
        send.fct, fct.sent)
```

The input buffer is described by the piece of OCCAM given in Annex 1 and 1A. The FIFO is here implemented as a circular buffer with a capacity of input.buffer.size, with two pointers into it ('first' and 'last').

This would correspond to the use of a small piece of random access memory in the input buffer itself. It will be appreciated that other techniques could be used to implement the FIFO without affecting the flow-control mechanism of the link modules. The input buffer size must be at least as great as the flow control batch size. If the flow-control batch size were 16, the input buffer size would have to be at least 16, and for smooth flow of data it might be somewhat larger, for example 20.

The output buffer also contains a short FIFO to smooth the flow of data. There is no restriction on the size of this FIFO imposed by the flow-control mechanism. The output buffer requests data to send by signalling on the path 38 request.out whenever it has space to buffer a code. At any time thereafter it may receive a code to be transmitted on the path 40 data.in.

The output buffer maintains a count of the number of codes still to be transmitted before the current flow-control batch is exhausted. Every time it transmits a code other than a null code or a flow-control token it decreases this count by one.

The output buffer is represented by the piece of OCCAM given in Annex 2. It contains a FIFO with capacity output.buffer.size, which might be for example 3. This piece of OCCAM (Annex 2) illustrates an alternative implementation of the FIFO, as a linear array whose contents are successively moved down whenever a code is removed from the bottom. It will be appreciated that a similar implementation could have been used for the input buffer, or that the circular buffer implementation used in the input buffer could have been used in the output buffer.

It will be appreciated that an equivalent degree of flow-control could be obtained in an alternative system in which the output buffer initialises its 'credit' to the size of a flow-control batch and the input buffer initialises its 'tokens outstanding' to the same value, instead of both being initialised to zero as shown here. In that case a flow control token would only be sent after the first flow-control batch had been transmitted, instead of before, as in the description above.

The Header Buffer

The structure of the header buffer 20 of each link La . . . Ln is illustrated in FIG. 3. The header buffer is controlled by control logic designated generally by block 51. There is a token buffer 50, which can hold one token, which can either be a nibble of data or an end-of-packet token. This token buffer 50 signals when it has received a token along the path 36 which is an end-of-packet token on the wire marked Got.EOP, and signals on the wire marked Got.token.b whenever it receives any other token. It transmits its contents to a switch 52 when it receives a signal from the control logic 51 on Send.t. The switch is controlled by the control logic 51 so that when a signal Set.s1 is high the switch 52 transmits its input to a multiplexor 54. When the signal Set.s1 is low the switch 52 transmits its input to an output multiplexor 56. The multiplexors 54, 56 are controlled by signals Set.m2 and Set.m1 from the control logic 51. The header buffer 20 also includes a first-in-first-out buffer (FIFO) 58 with sufficient capacity for a 2-byte header (4 tokens). It is permanently connected to the interval selector 22 by the Header connection 23 which is not shown in FIG. 3. When the signal set.m1 is high, the multiplexor 56 transmits the output of the FIFO to the channel DataOut 12a. When the signal Set.m1 is low, the output multiplexor 56 transmits the output of the switch 52 to the path 12a DataOut. When the signal Set.m2 is high, the multiplexor 54 transmits the output of the random header generator 24 (FIG. 1) received on path 27 to the FIFO. When the signal Set.m2 is low the multiplexor 54 transmits the output of the switch 52 to the FIFO. Whenever the FIFO 58 receives a token, it signals on the path Got.token.f, unless it is filled by the token, in which case it signals on the path Full. It outputs a token whenever it receives a signal on the path Send.h. If it becomes empty it signals on the path Empty. If it receives an input on the path Reset it discards all its contents, but does not signal on the path Empty. The effective size of the FIFO is controlled by an associated flag 60 which is a packet header length flag. If this flag is set, packet headers are 2 bytes long and the FIFO signals on the path Full only when it contains four tokens. If this flag is not set, packet headers are 1 byte long and the FIFO signals on the path Full only when it contains two tokens. In this case, the upper two tokens of the FIFO are forced to zero. The packet header length flags 60 are set identically in all the links La to Ln, and it will be appreciated that they could be implemented with a single latch whose output is fanned out to all the links. There is also a flag 62 associated with the control logic 51 which is the randomisation flag for the link. If this flag is set, a random header is obtained from the random header generator 24 for each packet arriving through the link. To enable this flag to be set differently for each link, there is a separate latch in each link.

The behaviour of the header buffer 20 depends on the setting of this randomisation flag of the link La:

if the flag 62 is set, the header buffer 20 signals the random header generator 24, and stores the random header which is returned. As soon as any data arrives from the link module 18, it signals on the path 61 called Select the connected interval selector 22;

if the flag 62 is not set, the header buffer is filled with the first data to arrive, and when it contains a header (1 or 2 bytes, depending on the setting of the packet header length) it signals the connected interval selector 22.

If the selector 22 signals to the buffer 20 that the header is to be discarded, this is done by resetting the FIFO 58, and the header buffer is refilled from the data stream, and when it contains a header (1 or 2 bytes, depending on the setting of the packet header length) it signals the connected interval selector. The header buffer transmits its contents in response to requests received from the crossbar switch 10. If the randomisation flag of the link is set, the header buffer refills itself from the random header generator, otherwise it refills itself from the data stream, and repeats the cycle after passing on a flow-control token.

The state machine description of the control logic 51 is given in Table I.

The Interval Selector

The operation of the interval selector 22 will now be explained with reference to FIG. 4. The interval selector performs the routing decision for each packet by means of an interval selection algorithm. The contents of the FIFO 58 of the header buffer 20 are presented continuously to a 'ladder' of 33 base and limit comparators 66a . . . 66n of which four are shown on the right of the figure. There are 33 comparators because there are 32 links in the described embodiment. Each comparator is connected to a pair of registers 68a . . . 68n, except the lowest comparator 66a, whose base is fixed at zero. Each register 68i−1 is connected to the base of one comparator 68i and the limit of another 68i−1, except for the top register 68n which is connected only to the limit of the topmost comparator 66n. In normal use, the registers are programmed with a non-decreasing set of 16-bit values, such that the top of the ladder is not zero The output of each comparator is connected to a respective 5-bit register 70a . . . 70n whose contents are sent to an address gate 72 if the packet header is greater than or equal to the base and less than the limit which are connected to the associated comparator. At the bottom of FIG. 4 is shown a single-value 'portal' comparator 74, whose outputs are gated by a Select gate 73 receiving the 'Select' signal from the header buffer 20. When the Select signal is sent by the header buffer the contents of the header buffer FIFO 58 is the packet header, which is connected by header path 23 to the input of the comparator 74. If the packet header is not equal to the contents of a 16-bit register 76 connected to the comparator 74, a 'No' signal is sent to the Select gate 73, which then allows the address which is produced from the 'ladder' of base and limit comparators 60a . . . 66n to be sent out to the crossbar switch 10 along path 26. If the packet header is equal to the contents of the 16-bit register 76 connected to the comparator 74, a 'Yes' signal is sent to the header buffer 20 telling it to discard that header via path 21. In this case the output of the ladder of comparators is not sent to the crossbar switch 10.

The Random Header Generator

Figure 5:
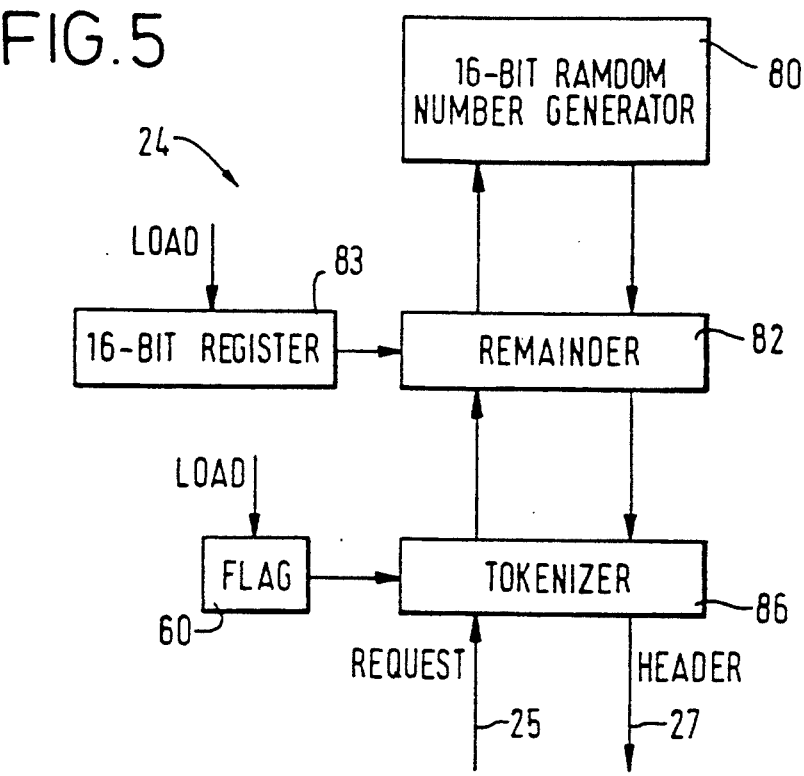
FIG. 5 is a block diagram of the random header generator.

The operation of the random header generator will now be described with reference to FIG. 5. A random number generator 80 at the top of FIG. 5 generates 16-bit pseudo-random numbers using a shift-register with feedback or some other method. When it receives a signal from a remainder unit 82 connected thereto it produces such a number. The remainder unit 82 computes the remainder of this number by the value held in an associated 16-bit register 83. When the remainder unit 82 receives a signal from a tokeniser unit 86 it sends on this 16-bit computed remainder, and requests another pseudo-random number from the random number generator 80. The tokeniser stores the 16-bit remainder until it receives a request from the header buffer 20 along path 25. It then transmits the least significant four bits of the remainder, and shifts down the remaining bits by four places. It repeats this action until it has sent the number of nibbles corresponding to the length of the header (which is 2 or 4 depending on the setting of the associated flag 60 (which is shown in FIG. 3) and then restarts its cycle. It will be appreciated that the range of random headers generated could be made completely general by incorporating an additional 16-bit register and an adder to add its contents to the output of the remainder unit before passing the result to the tokeniser.

The Header Stripper.

Figure 6:
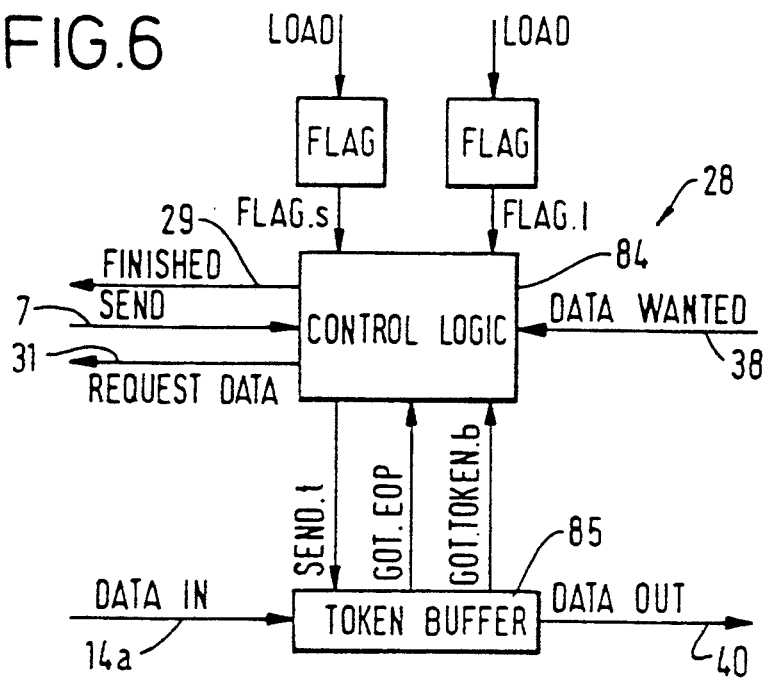
FIG. 6 is a block diagram of the header deletion circuitry.

The operation of the header stripper will now be described with reference to FIG. 6. It can be seen that there is a single token buffer 85, which is in fact identical to the token buffer 50 in the header buffer 20 (FIG. 3). The token buffer 85 signals to control logic 84 when it has received a token along the path 14a DataIn which is an end-of-packet token on the wire marked Got.EOP, and signals to control logic 84 on the wire marked Got.-token.b whenever it receives any other token. It transmits its contents on DataOut path 40 when it receives from the control logico 84 a signal on Send.t. The control logic 84 is a state machine with the state transitions shown in Table II.

The Crossbar Switch

Figure 7:
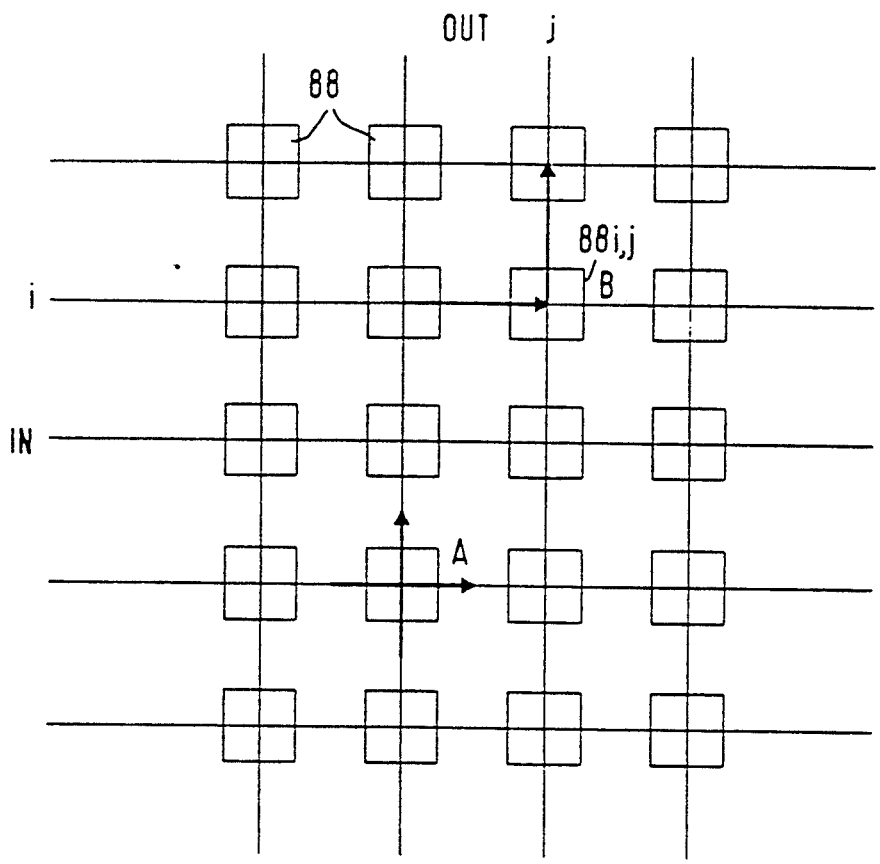
FIG. 7 represents part of the switching circuitry of the routing switch.

The crossbar switch 10 is a 32 by 32 array of switch elements 88. FIG. 7 shows a portion of the crossbar switch 10 showing 20 switch elements with thick arrows indicating the flow of data. Requests for data flow in the opposite direction and are not shown in FIG. 7. Initially all the switch elements are "off", i.e. in state A in FIG. 7. When input i is to be connected to output j then switch element 88 ( i, j ) is switched "on" and the data flows from the input to the selected output as shown in state B in FIG. 7.

Figure 8:
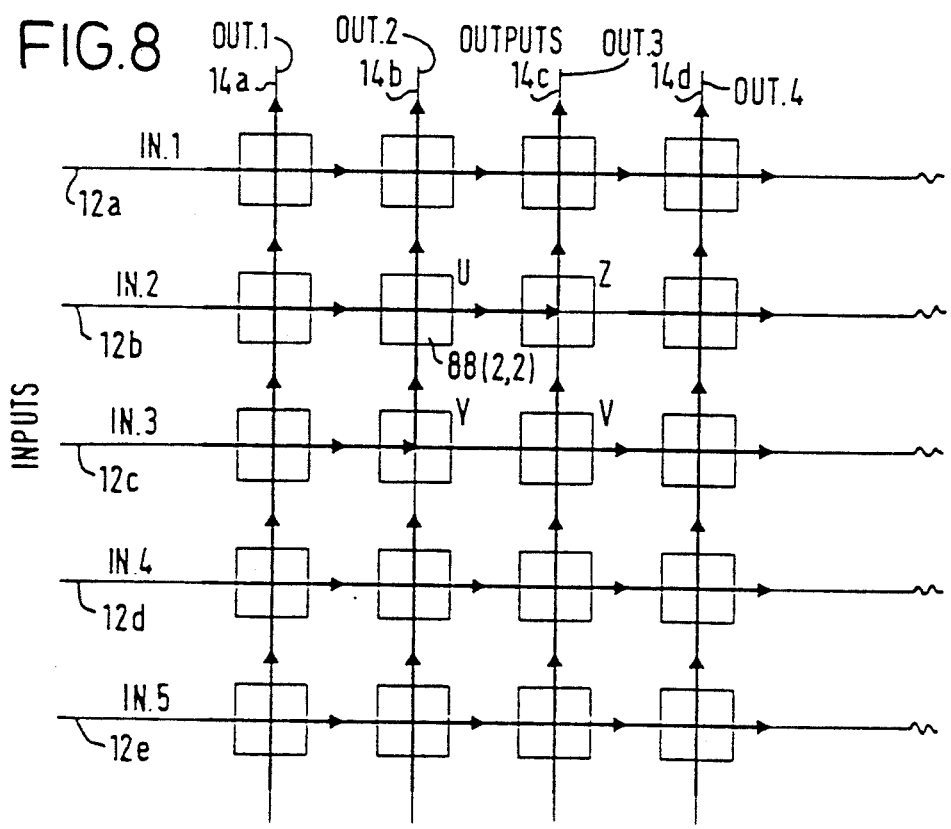
FIG. 8 shows the flow of data through part of the switching circuitry.

FIG. 8 shows the flow of data in a 4-by-5 section of the crossbar switch 10 when two of the switch elements Y and Z are set "on" and all the others are "off". Notice that in this configuration the input 12b in.2 is connected to the output 14c out.3 and that input 12c in.3 is connected to output 14b out.2. Note that the switch element U 88 (2,2), which is in the 'off' state, is passing data for both of these connections. Note also that the 'on' state of switches Y 88 (3,2) and Z 88 (2,3) has disconnected switch V 88 (3,3), but this is of no consequence, since the input in.3 is connected to out.2 via switch Y, so that switch V is not needed to pass data from that input; and that output out.3 has been connected to input in.2. The arbitration circuitry 32 means that switch V is not required to pass data to output out.3 either.

Figure 9:
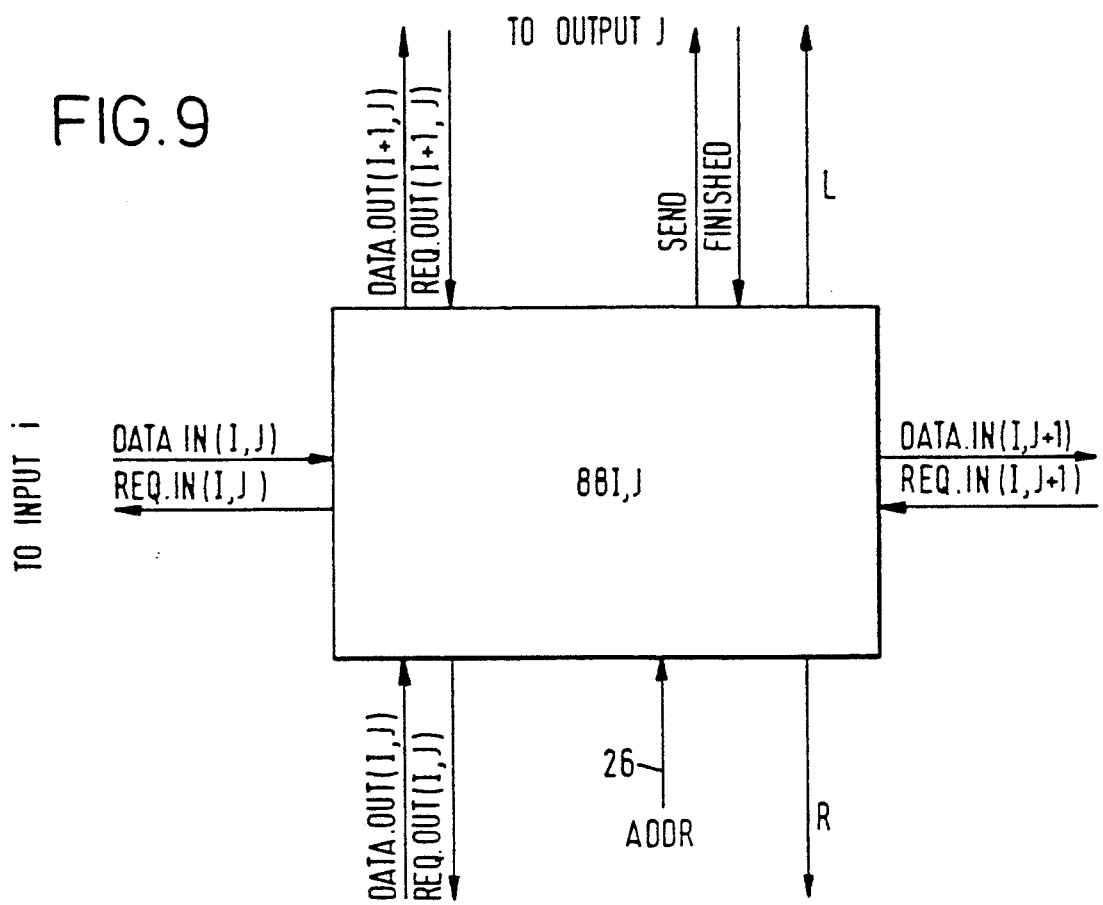
FIG. 9 shows the external connections to one of the switch elements of the switch circuitry.
Figure 10:
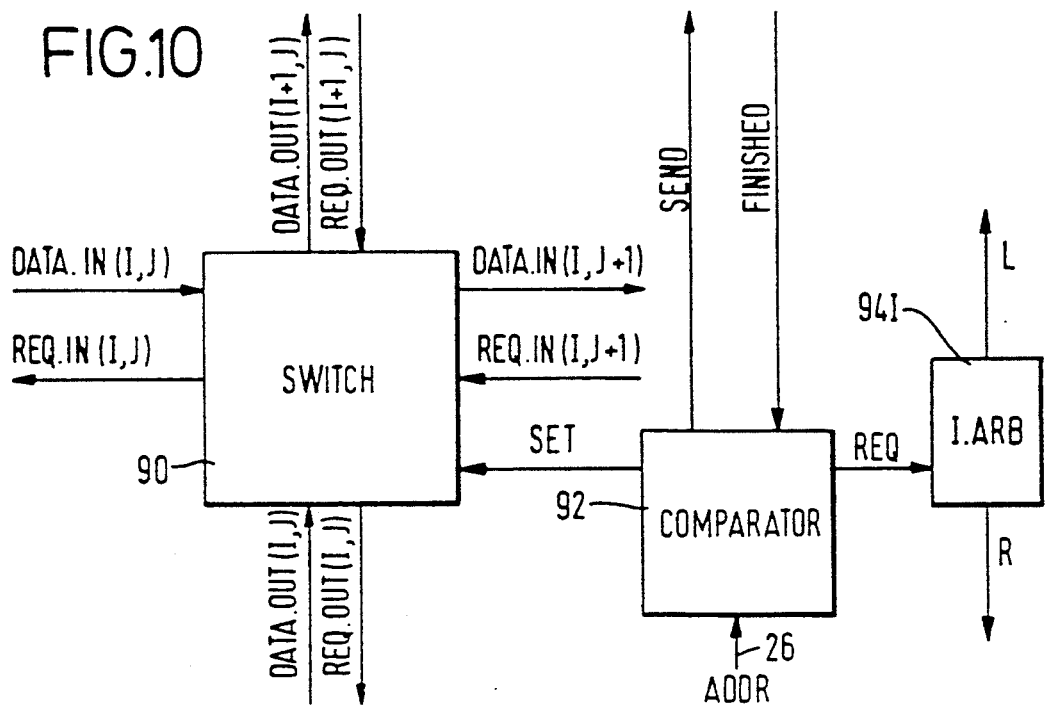
FIG. 10 is a block diagram of the structure of a switch element.

The external connections of each switch element 88 (i,j) are shown in FIG. 9. The line ADDR, which is the address path 6 from the interval selector 22, is connected to all the switch elements in each row, i.e. those with the same i value. These connections are discussed more fully in the following. Each switch element 88 (i,j) of the crossbar switch is identical and the block structure of one of these elements is shown in FIG. 10. There are three main components: a switch 90, a comparator 92 and an arbiter server (ARB) 94 which are described in turn below.

Note that the communications between the components of the switch element and between the arbiter servers of each switch element are all synchronised, i.e. there is an implicit handshake in each one. These arbiter servers form the arbitration circuitry indicated diagrammatically in FIG. 1 by reference numeral 32.

The switch 90 is set via an internal path called set. In its "off" state (A in FIG. 7) data and request signals pass undiverted through the switch 90, i.e.

data.in(i,j) is connected to data.in(i,j+1)
req.in(i,j) is connected to req.in(i,j+1)
data.out(i,j) is connected to data.out(i+1,j)
req.out(i,j) is connected to req.out(i+1,j)

On receiving a signal on 'set' the switch is set "on" (B in FIG. 7) so that the data from input i is diverted to output j and the requests from output j are diverted to input i, i.e.:

data.in(i,j) is connected to data.out(i+1,j)
req.in(i,j) is connected to req.out(i+1,j).

The switch is reset by a signal on set.

A state machine description of the behaviour is given in Table III.

The comparator 92 decides when the switch 90 is to set and reset. In order to set the switch 90 an address will be received along path 26 from the interval selector 22 (FIG. 1) and if this corresponds to the output index j of the switch element the comparator 92 signals along req to the arbiter server 94. The address output ADDR of the interval selector 22 is connected to all the switch elements of the input row i, but since the output index j is different for each switch element of the row only one of the comparators will respond. When the signal on channel req is accepted by the arbiter server 94 this indicates that input i has been selected to use output j (i.e. input i has "privilege") and the comparator then signals along the internal path set to set the switch 90. Requests for data are then transmitted from the output to the input and data codes from the input to the output via the switch 90 until an end-of-packet token is received by the header stripper 28 which communicates along path 'finished' 29 that the packet has been passed. The switch is reset and the privilege relinquished by the comparator signalling along set and req respectively. The state machine description of the comparator is given in Table IV.

Figure 11:
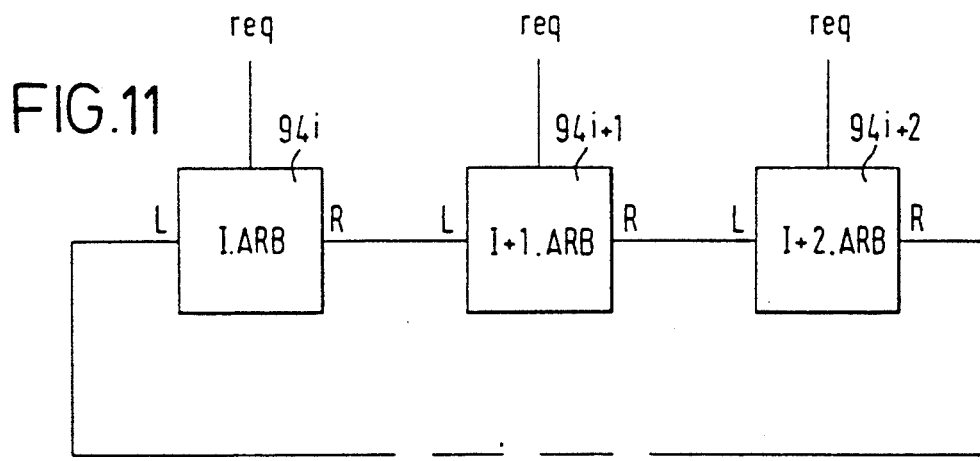
FIG. 11 is a diagram illustrating operation of the arbitration circuitry of the switch circuitry.

For a given output j the arbiter servers 94 of the elements 88 (i,j) form a ring arbiter serving that output. This is to ensure that at any time only one input can be connected to that output. The arbiter servers 94i are connected in a ring via channels L and R as shown in FIG. 11. At any time one of the servers 94 holds the "privilege" i.e. it can grant the use of the output to its switch 90. A comparator requests the use of the output along path req and it is then said to be candidate. If the request is accepted then the switch 90 uses the output and communicates again along the same path when it has finished. A non-priviliged server 94 transmits a request from its comparator or from its left hand channel to the ring along R. When the request reaches the privileged arbiter server it is reflected back to the left until it reaches the arbiter server that issued the request which then becomes privileged. A server that is candidate will ignore a clockwise circulating request until it has served its comparator. The implementation of this strategy of passing requests clockwise and reflecting the privilege counterclockwise means that no messages need actually be reflected: the completion of a communication along the req channel is interpreted as granting the use of the output to that switch.

The state machine description of the arbiter server is given in Table V.

Consider the following example. Suppose that in FIG. 11 the arbiter server 94i+2 has the privilege, the arbiter server 94i+1 neither has privilege nor is candidate and the arbiter server 94i has just become candidate. Consider what happens on the L and R channels of each server.

Arbiter server 94i: There is a pending request on req but this arbiter server is still in the notpriv state until it can output on R. This communication can only complete if arbiter server 94i+1 inputs on its L channel.

Arbiter server 94i+1: The above output on R is in effect a pending communication on the L channel of arbiter server 94i+1. In order to communicate on channel L it must first output on its channel R.

Arbiter server 94i+2: This is using the output and now has a pending communication on its input L. In order to complete the communication it must first receive the second of its communications along req (i.e. this switch element has finished using the output) to change its state to priv. Once in this state it can complete the communication along L.

This communication being completed allows the arbiter server 94i+1 to complete its communication along R and in turn the arbiter server 94i can now complete its communication on req passing the privilege to this server.

Initialisation of Flags and Registers

The following parameters must be supplied before the routing switch can operate:

The packet header length (1 or 2 bytes)

The comparator settings for the interval selectors 22, and the associated output link numbers for each range of destination node identifications;

The portal comparator value for the interval selector 22;

For each link: the 'randomise on input' and 'strip header on output' flags must be set;

The range of the random headers (if any of the 'randomise on input' flags are set).

These have to be input by the routing switch and loaded into the appropriate latches and registers. This could be done in a variety of ways, for example by sending pre-defined command codes down an extra dedicated link, which has channels to all the latches and registers. Note that all the interval selectors and random header generators must be programmed identically. This initialisation is indicated diagrammatically in FIG. 1 by initialisation logic 30.

The device has been described with one interval selector and one random header generator per link. It will be appreciated that both of these units are used only once or twice per packet input by the link, and so could in principle be shared between several links, connected by a bus, using an arbitration scheme to resolve multiple simultaneous requests for either resource. For example the arbitration method used in the crossbar switch 10 could be used to share an interval selector or random header generator between several links.

Figure 13:
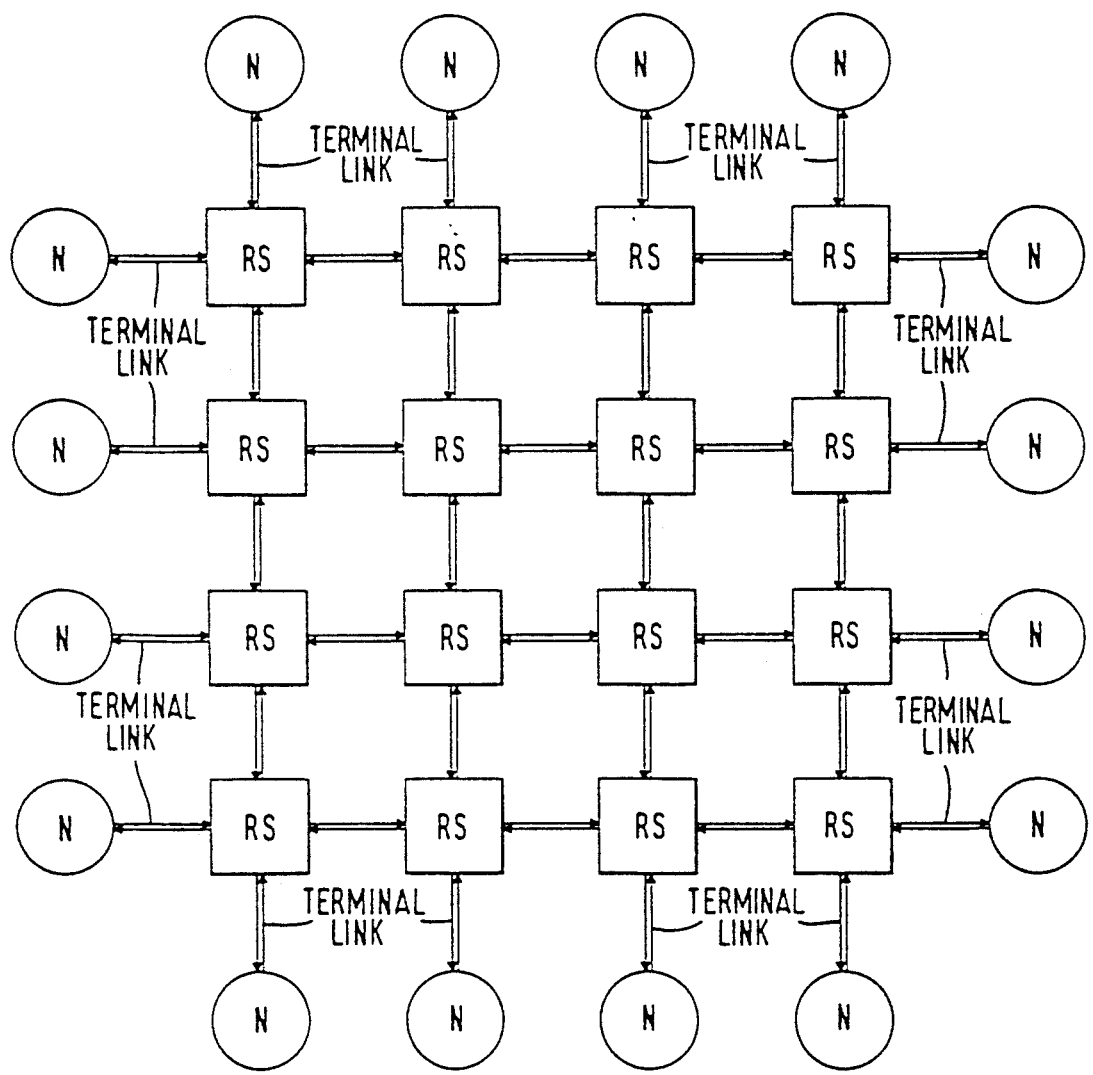
FIG. 13 is an example of a grid computer network.

The operation of the routing switch to achieve efficient routing of messages in a computer network will now be described. FIG. 13 shows an example of a network which uses a plurality of routing switches RS to route messages between source nodes and destination nodes represented in FIG. 13 by circles marked N. The routing switches are interconnected by their links L, each link having a hard wired bidirectional pair of unidirectional channels as represented by reference numerals 4, 6 in FIG. 1. The source and destination nodes N of the network can be any type of computer device, but the routing switch described herein is particularly applicable for networks having microcomputers as described in GB 111399 and in our copending British Patent Application No. 546,589 (Page White & Ferrer Ref: 66588). Connections to destination and source nodes N are called terminal links in FIG. 13. In FIG. 13 each routing switch is shown with four message links — in fact in the embodiment described above there are 32.

Wormhole Routing

The routing switch of FIG. 1 dynamically switches message packets from its inputs to its outputs according to the values of the packet headers.

In most known packet-switching networks each intermediate routing switch inputs a packet, decodes the header, and then forwards the packet to the next routing switch. This is called store-and-forward routing. This is undesirable because it requires storage in each routing switch for transmitted packets and it causes potentially long delays between the output of a packet and its reception.

A more efficient approach is wormhole routing, in which the routing decision is taken as soon as the header of the packet has been input by the routing switch. If the output channel $6a \ldots 6n$ chosen is free, the header is output from it, and the rest of the packet is sent directly from the input to the output without being stored in the routing switch. This means that data of a packet can be passing through several routing switches at the same time, and the header of the packet may be received by the destination node $N_D$ before the whole packet has been transmitted by the source node $N_S$. Thus this method can be thought of as a form of dynamic circuit switching, in which the header of the packet, in passing through the network, creates a temporary circuit (the 'wormhole') through which the data flows. As the tail of the packet is pulled through, the circuit vanishes.

This method overcomes the problems of store-and-forward routing, but it has the disadvantage that if a routing switch is unable to send a packet on immediately (because the required output channel 14 is busy) all the message links through which the packet is currently passing are occupied (in that direction) until it can proceed. The number of message links which are 'occupied' by a stalled worm is the ratio of the packet size to the buffer capacity of each connected pair of links.

Note that, as far as the senders and receivers of packets are concerned, the wormhole routing is invisible. Its only effect is to minimise the latency in the message transmission. If one or more intermediate routing switch were to store-and-forward the packet it would still be delivered correctly. The routing switches of the present invention can hence be connected in networks containing other types of routing devices.

Referring to FIG. 1, the header of a message packet arriving at the link La on the channel Data.in 4a is passed by the link module 18 to the header buffer 20. Either that header or a header generated by the random header generator 24 is sent to the interval selector 22 which addresses the crossbar switch 10 according to the header. The switch circuitry 10 is hence set to connect the input 12a of link module La to the appropriate output 141, and the incoming message passes through the routing switch.

Deadlock

Figure 12:
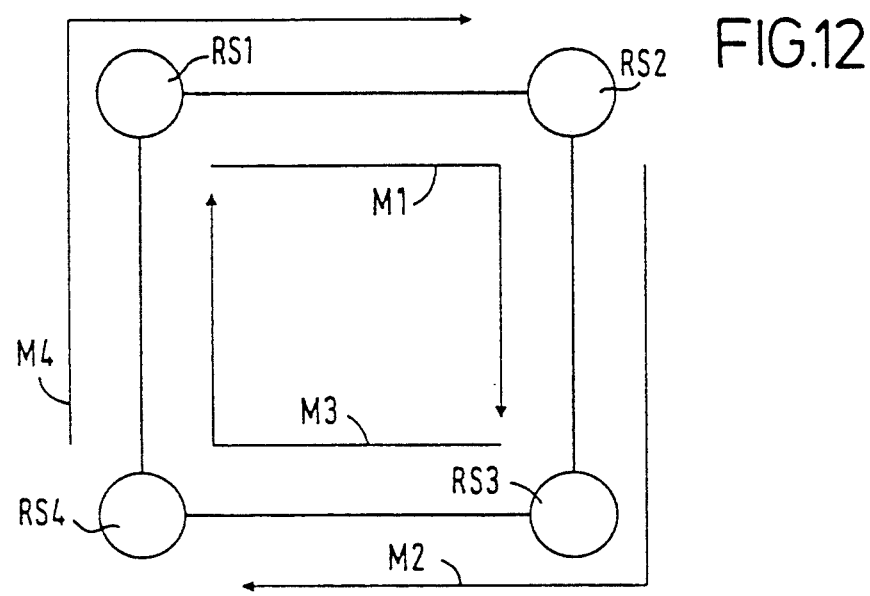
FIG. 12 is an example of a computer network in deadlock.

An important property of a communications network is that it should not "deadlock". In fact, deadlock can occur in most networks unless routing switches in the network operate in accordance with a routing algorithm which is designed to prevent it. For example, consider the square of four routing switches RS1-RS4 shown in FIG. 12. The messages in transmission are indicated by the arrows M1-M4. Suppose that every routing switch attempts to send a message to the opposite corner at the same time, and that the routing algorithm routes messages in a clockwise direction. Then each link will become 'busy' sending a message to the adjacent routing switch and the network will deadlock because no message can proceed to its destination.

It is important to understand that deadlock is a property of the network topology and the routing algorithm used, and so it can also arise even if packets can be buffered at routing switches before they are transmitted. In the above example, a single packet buffer at each corner is sufficient to remove the deadlock (provided that no new messages are initiated before the first four have been delivered). In general, however, the number of packet buffers needed to eliminate deadlock depends on the network topology, the routing algorithm and the applications program. This is clearly not a satisfactory basis for the architecture of a general purpose routing system. Wormhole routing has always been considered to exacerbate the problem of deadlock, since long messages can trail through the network occupying several links.

Such problems can be avoided by choosing networks for which it is possible to devise deadlock-free wormhole routing algorithms. In such networks, buffers need to be employed only to smooth the flow of data through the network and to reduce congestion; a buffer of size much less than the length of a packet would often be sufficient for this purpose. Most important of all, the buffering needed is not dependent on the network size or the communications pattern, and so the inventors have found that it is possible to construct a single universal routing switch which can be used for networks of arbitrary size and for communications patterns of arbitrary complexity. One suitable algorithm for use in the interval selector 22 is described below under the heading "Interval Routing".

Interval Routing

Consider a network consisting of a collection of routing switches RS connected together by bidirectional message links. Some links of the routing switches are connected to devices exterior to the network, for example to microcomputers such as the Transputer. Such links are called terminal links, as shown in the example of FIG. 13. Message packets enter and leave the network from and to source and destination nodes via terminal links.

The routing switches themselves neither create nor destroy packets.

An interval labelling scheme issues identifications to destination nodes by assigning a distinct label to each terminal link. For simplicity, the labels for a network with n terminal links can be numbers in the range [0, 1 ..., n−1]. At each routing switch RS in the network, each output channel has one or more associated intervals— in this example a set of consecutive labels. The intervals associated with the output channels are non-overlapping and every label will occur in exactly one interval. As described above, these intervals are set in the interval selector 22 by the base and limit comparators 66 $a \ldots n$ in FIG. 4.

As a message packet arrives at a routing switch, its header portion is examined by the interval selector 22 to determine which interval contains a matching label; the message is then forwarded along the output channel 14 associated with that interval.

Figure 14:
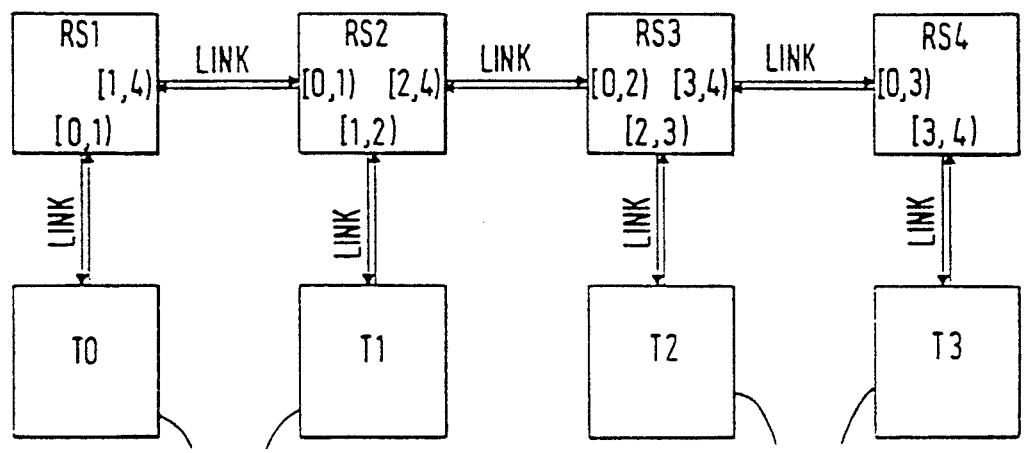
FIG. 14 is another example of a computer network illustrating interval selection.

For example, consider the simple network shown in FIG. 14. This shows a network of four routing switches (RS1, RS2, RS3, RS4), which has four terminal links, each of which is connected to a transputer T0, T1, T2, T3. The numbers assigned to the terminal links are those shown on the transputers. The intervals associated with the output channels of the routing switches are shown next to the corresponding message. Each interval is shown as a pair of numbers [x,y). The corresponding link will be selected if and only if the header of the packet is greater than or equal to the first number of the interval and less than the second number of the interval.

For example, if the interval is [1,4), packets with headers 1, 2 or 3 will be selected, but those with headers 0, 4 and above will not.

Other links of the routing switches which are not shown can be assumed to be associated with intervals in which the two numbers are the same (x=y) and which will consequently never be selected.

Now consider what happens if the transputer T0 in FIG. 14 sends a packet with a header of 1 to its connected routing switch, labelled RS1 in FIG. 14. The routing switch RS1 compares the header with each of its intervals, and finds that the header is contained in the interval [1,4). Thus the outgoing link connected to routing switch RS2 will be selected. When the header of the packet is input by routing switch RS2 it is compared with all the intervals of that device. The header falls into the interval [1,2), so the link connected to transputer 1 is selected. The packet is then routed into transputer T1.

Now consider what happens if the transputer T2 sends a packet with a header of 0 to its connected routing switch, labelled RS3 in FIG. 14. The routing switch compares the header with each of its intervals, and finds that the header is contained in the interval [0,2). Thus the outgoing link connected to routing switch RS2 will be selected. When the header of the packet is input by routing switch RS2 it is compared with all the intervals of that device. The header falls into the interval [0,1), so the link connected to routing switch RS1 is selected. When the header of the packet is input by routing switch RS it is compared with all the intervals of that device. The header falls into the interval [0,1), so the link connected to transputer T0 is selected. The packet is then routed into transputer T0.

Thus we see that in this example links of the network of routing switches can be assigned intervals so that packets can be sent from transputer T0 to transputer T1 and from transputer T2 to transputer T0. Messages can in fact be sent between any pair of transputers in this example.

However it is not obvious that such a labelling scheme can always be found that will succeed in routing all packets to their destinations. Indeed, one chosen at random will almost certainly not do so, because it will contain cycles, i.e. packets will circulate forever. A labelling scheme which correctly delivers all packets is called valid. There now follows an algorithm to generate a valid labelling scheme for any network.

Algorithm to Interval-label Any Network

Please note that in the following description the word "node" is used to designate junction nodes in the network, i.e. routing switches. It is not restricted to the destination and source nodes discussed above.

First cover the network with a spanning tree, which includes all the terminal links. Remove any leaf nodes without any terminal links, and remove any duplicate links between nodes of the tree. All links which are not part of the tree are given intervals with the upper and lower limits the same, so that they can never be selected. Now label the links in the spanning tree as follows:

Let N be the total number of terminal links of the network. At all times, let i be the number of terminal links labelled so far (i is initially zero). Starting from the root node R of the spanning tree, for each node V, set $j_v$ to the current value of i, then successively label each terminal link from the current node V with the interval [i,i+1) (incrementing i each time). Then pick an outgoing link of the tree from V and give it the interval [i,$a$), where $a$ is to be determined later. Proceed to the connected node, and repeat this procedure until a leaf node of the spanning tree is reached, and all its terminal links are labelled.

Now backtrack; each time a link is traversed up the tree, label the return link to the tree with the pair of intervals [i, N), [0,j). (This is the reason why a 32 tree link routing device is provided with 33 intervals.) If the subtree just labelled contains the last leaf node in the tree, i=N and so we can discard the second interval. Having backtracked to the previous node, V, replace the undetermined $a_v$ with i (note that the value of i is different from when the lower bound of the interval was assigned, since terminal links have been labelled since then). Now pick an unlabelled branch of the tree, give it the interval [i,$a$), and proceed until all subtrees have been labelled.

This algorithm is formalised in the recurslye procedure given in Annex 3. The algorithm is invoked by picking a terminal link T of the root node R, setting i to zero, and calling LABELTREE (i, T, R, N).

As an example consider the network shown in FIG. 14. The labelling shown is generated by the above algorithm if it is called with R router RS1, T the link to transputer T0, i zero and N equal to four.

Proof Of Validity

It can be shown that the labelling generated by the above algorithm is always valid.

Consider a packet with header m that arrives at a node V. There are two cases to consider, depending on whether the terminal link numbered m belongs to a subtree of V or not:

Case I: m belongs to a subtree of V.

Each link to a subtree of V is labelled with the interval $[i,\alpha)$, where i is the label of the first terminal link of the subtree, and $\alpha$ is one more than the label of the last terminal link in the subtree. Terminal links of V are a special case of this rule.

Thus the packet with header m will be routed down the link to the subtree which contains the terminal link with label m, and so by induction the packet is routed out of the correct terminal link.

Case II: m does not belong to a subtree of V.

From the algorithm it can be seen that all terminal links of subtrees of any node V have labels between j (the number of terminal links labelled when the algorithm reaches V) and $i_v$, where $i_v$ is the value of i when the algorithm backtracks from V. By construction, the link from V to the rest of the tree is associated with the intervals containing all labels outside this range. Thus if the terminal link labelled m does not belong to a subtree of V the packet will be routed up the tree.

By induction, the packet must eventually reach a node such that the terminal link labelled m belongs to a subtree of that node. By the first case above, the packet is now routed to the correct terminal node.

The above algorithm also has the important property that a network operating in accordance therewith is free of deadlock.

Proof of Deadlock Freedom

Consider the two ends of a link joining two nodes, V and W, where V is nearer the root of the tree. At V the link is labelled with the interval $[i,\alpha)$, where i is the label of the first terminal link of the subtree starting with W, and $\alpha$ is one more than the label of the last terminal link in the subtree. At W the link is labelled with the pair of intervals $[i,N)$, $[0,j)$. Since these intervals have no label in common any packet which is routed along the link in one direction can never be routed along the same link in the opposite direction. Thus no packet is ever sent further up the tree than necessary, for if it were, it would have to backtrack along one or more links, which the preceding argument has shown to be impossible.

Now consider a collection of subtrees $T_k$, indexed by k. Each subtree $T_k$ has one root link $r_k$ connecting it to the larger tree. Consider the larger subtree T formed by connecting the root links of all the $T_k$ to a routing node R. A further link from T is the root link r of the whole subtree. Any packet arriving at R along any of the $r_k$ is routed either to one of the $r_j$ ($j \neq k$) or to r. We assume, as an inductive hypothesis, that each of the $T_k$ is deadlock-free, and so any packet routed to one of the $T_j$ will eventually be routed out of a terminal link and consumed. Any packet routed out along r will be consumed by the environment. Any packet arriving on r will be routed to one of the $T_k$ and similarly consumed. It remains to show that a subtree with only one node is deadlock-free; this is true provided that the terminal links will send and receive packets at the same time. By induction on the size of subtree, the deadlock-freedom of the whole network follows.

It will be appreciated that the labelling produced by this algorithm does not route packets by the shortest possible routes unless the network is itself a tree. However it does produce a valid deadlock-free routing.

For certain other classes of networks (for example binary n-cubes and m-dimensional grids with no wrap-around) valid deadlock-free interval labellings are known which deliver packets by shortest routes.

Redundant Labelling

It will be appreciated that the operation of the interval selector allows more than a single label to be associated with each terminal link of a routing switch. A valid labelling scheme in which each terminal link is associated with a single label can be transformed into one in which a selected terminal link is associated with a range of labels as follows:

If the label associated with the selected terminal link is k, the associated interval is $[k,k+1)$. To extend this interval to $[k,k+m)$, modify the other intervals in the scheme as follows:

Replace any interval $[a,b)$ in which $a \leq k$ and $k > b$ (that is, the interval contains k) with the interval $[a,b+m)$;

Replace any interval $[a,b)$ in which $a > k$ with the interval $[a+m, b+m)$;

Leave other intervals unaltered.

By repeating this process, any number of terminal links can be given ranges of associated labels.

If an interval containing more than one label is associated with a terminal link, then it will be appreciated that packets with a range of header values will be routed out of that link. Thus the labelling is redundant in the sense that only one label was required to route packets out of that link. However if the terminal link does not delete the headers of packets leaving the network via it then the redundancy of the labelling may be used to encode additional information into the packet header. This is useful for example in the case of our co-pending Application No. 546,589 (Page White & Farrer Ref: 66588) where the redundancy of the labelling can be used to identify a particular virtual link of a microcomputer connected to the terminal link of the network.

By combining the selection of the virtual link with additional information it is possible to minimise the total length of header information included with the packet.

Universal Routing

Multiprocessor interconnection networks are very troubled by the phenomenon of hot-spots, where the performance of the whole network is limited because traffic is funneled through a few routing switches or message links. This can occur either as a consequence of the applications program (in which case little can be done) or because of the routing algorithm used; even in the case where processors connected to terminal links of the network communicate only in pairs, so the network could in principle route all the required messages without collision, some routing algorithms can deliver performance an order of magnitude or more below the capacity of the network.

The operation of a simple routing algorithm for networks discussed herein is described in the following and consists of two phases. In the first phase each packet is dispatched to a randomly chosen node using an appropriate (deadlock-free) greedy algorithm. In the second phase, each packet is forwarded to its final destination node, again using an appropriate (deadlock-free) greedy algorithm. A greedy algorithm is one which takes a shortest path to its destination.

Addition and Discard of Random Headers

This is implemented using the present routing switch by setting the randomise flag 60 (FIG. 5) on each terminal link La ... Ln of the routing switch which is a terminal link of the network. Whenever a packet starts to arrive along such a link, the random header generator 24 generates a random number and the header buffer 20 and interval selector 22 behave as if this were the packet header. The remainder of the packet then follows the newly supplied random header through the network until the header reaches the intermediate (random) destination. At this point, the first phase of the routing algorithm is complete and the random header must be removed to allow the packet to progress to its final destination in the second phase. In order to remove the random headers each routing switch is programmed with its identity as an intermediate destination, and every packet that arrives at the switch has its header checked against this value. Whenever the header of a packet corresponds to the intermediate identity of a routing switch, that header is discarded in response to the Discard signal from the interval selector 22 and the following bytes of the packet which represent the original packet header are processed with the interval labelling algorithm.

In this way packets can be given random headers to route them to a randomly chosen intermediate destination and have them deleted again at the intermediate destination so that the second phase of the routing algorithm can proceed to take the packets to their originally chosen terminal links.

Avoiding Deadlock

Unfortunately, performing routing in two phases in the same network makes the paths of the packets more complicated. The result is that deadlock can now occur.

One solution to this problem is to ensure that the two phases of the routing algorithm use completely separate links. The set of labels produced for the interval labelling is partitioned into two subsets. The first subset, e.g. the low half contains the labels used to identify the intermediate destinations; labels from this subset are randomly generated and used as headers for the randomising phase. The labels in the second subset, e.g. the high half are used for the terminal links, and so the original headers of the packets are chosen from this subset and used for the second and final (destination) phase. Similarly the links are partitioned into two subsets, one subset for the first, randomising phase and one subset for the second, destination phase. Links in the first subset are associated with intervals which are contained in the low half of the set of labels, and links in the second subset are associated with intervals which are contained in the high half of the set of labels.

Effectively this scheme provides two separate networks, one for the randomising phase, and one for the destination phase. The combination will be deadlock free if both of the networks are deadlock-free. The simplest arrangement is to make the randomising network have the same structure as the destination network— and to make both employ a deadlock-free routing algorithm.

Multi-phase Routing

The main disadvantages of an interval labelling scheme are that it does not permit arbitrary routes through a network, and it does not allow a message to be routed through a series of networks. These problems are overcome in the described routing switch by the header stripper 28. As described above, each message link of a routing switch can be set to delete the header of every message just before it is transmitted. The result is that the data immediately following becomes the new header as the message enters the next node.

Now suppose there is a module which is a labelled network, some of whose terminal links connect to other such modules. Now if these message links are set to remove the header, a packet addressed to one of them will in fact be transmitted with the header that got it there replaced by a subsequent portion of the message to form a new header to take it to a further destination.

Now consider two such modules connected by one or more links. If a routing switch in one module sends a packet with the address of one of the terminal links of that module connected to the other module, then before the packet traverses the connecting message link the header is deleted and a new address is revealed as the header. Provided this is an appropriate label for the other module's network the packet will now be delivered in the usual way. The only complication is that the packet must be sent with the final address prepended to the data part.

If the terminal link of the second module to which the packet is addressed is connected to a third module and is set to delete headers also, the packet can be directed into yet another module, where a third address is pulled to the front. In this way an arbitrary number of module boundaries can be crossed, provided enough extra headers are included when the packet is first sent.

In the extreme case the 'modules' can be individual routing switches, so that the packet is explicitly steered by the set of headers and the interval labelling becomes trivial. This is useful for permutation networks where one wishes to obtain conflict-free routing.

Modular Composition of Networks

Where network modules are connected together, care must be taken not to introduce the possibility of deadlock. Even though the labelling schemes within each module may be deadlock-free, a set of multi-phase messages might produce a deadlocked configuration.

Suppose we have a higher-level network, each of whose 'nodes' is a module. The conditions for the total network to have deadlock-free routing are simply:

the routing strategy in the top-level network must be deadlock-free;

the individual modules must be deadlock-free;

the modules must have full interconnectivity.

The last point means that the paths of packets to nodes in the module, the paths of packets from nodes in the module, and the paths of packets passing through to other modules must not traverse the same link in the same direction.

Thus provided these conditions are met, the simple mechanism of header deletion enables networks of arbitrary size and complexity to be constructed with efficient deadlock-free routing of message packets.

The above description relates to a routing switch which can be formed as an integrated circuit or a single chip, with the input and output data paths $4a \ldots 4n, 6a \ldots 6n$ having dedicated pins. It is also envisaged that a routing switch could be combined with a microcomputer on a single chip, in which case effectively all the message links of the microcomputer would be permanently connected to links of the routing switch by on chip connections. Off chip communication would then occur always via the free links of the routing switch.

Annex 1

```
PROC InputBuffer (CHAN OF BYTE Codes.In, Data.Out,
                  CHAN OF BOOL Request.In, Fct.Seen, Send.Fct, Fct.Sent)

[input.buffer.size]BYTE buffer :
  INT first, last, tokens.buffered, debit :
  BOOL request.pending, output.buffer.ready :
  BOOL signal : -- used to send and receive signals; its value is never used
  ... PROC SendOnToken () -- detailed later
  BYTE code :
  SEQ
    first, last := 0, 0 -- initialise the pointers into the buffer
    tokens.buffered, debit := 0, 0
    request.pending, output.buffer.ready := FALSE, TRUE
    WHILE TRUE
      PRI ALT
        Codes.In ? code
          CASE code
            NULL
              SKIP -- ignore a null code
            FCT -- a flow-control token has been received
              Fct.Seen ! signal -- inform the output buffer of this
            ELSE -- put the received code into the buffer
              SEQ
                buffer[last] := code
                last := (last + 1)
                input.buffer.size
                tokens.buffered := tokens.buffered + 1
                debit := debit - 1
                IF
                  request.pending -- the buffered code is wanted already
                    SendOnToken () -- sets request.pending to FALSE
                  TRUE
                    SKIP
        Request.In ? signal -- a request for buffered data
          IF
            tokens.buffered <> 0 -- send token if any buffered
              SendOnToken () -- sets request.pending to FALSE
            tokens.buffered = 0 -- the buffer is empty
              request.pending := TRUE
        Fct.Sent ? signal
          output.buffer.ready := TRUE
        output.buffer.ready AND ((tokens.buffered + debit) <=
              (input.buffer.size - flow.control.batch.size)) & SKIP
          SEQ -- send a flow-control token if there is enough space for a batch
            Send.Fct ! signal -- ask output buffer to send an FCT
            output.buffer.ready := FALSE
            debit := debit + flow.control.batch.size
:
```

Annex 1A

The procedure SendOnToken is as follows:

```
PROC SendOnToken ()
  SEQ
    Data.Out ! buffer[first]
    first := (first + 1)
    input.buffer.size
    tokens.pending := tokens.buffered - 1
    request.pending := FALSE
:
```

Annex 2

```
PROC OutputBuffer (CHAN OF BOOL Clock.In,
                   CHAN OF BYTE Codes.Out, Data.In,
                   CHAN OF BOOL Request.Out, Fct.Seen, Send.Fct, Fct.Sent)

[output.buffer.size]BYTE buffered.tokens :
  INT count, credit :
  BOOL waiting.for.token, want.fct :
  BOOL signal : -- used to send and receive signals; its value is never used
  SEQ
    -- initialise
    credit, count := 0, 0
    waiting.for.token, want.fct := FALSE, FALSE
    WHILE TRUE
      PRI ALT
        Clock.In ? signal -- clock ticks; send a code
          IF
```

-continued
```
          want.fct -- the input buffer has asked for a f.c.t. to be sent
            SEQ
              Codes.Out ! FCT
              Fct.Sent ! signal -- tell the input buffer the code is sent
              want.fct := FALSE
          (count > 0) AND (credit > 0)
            SEQ -- output a token
              Codes.Out ! buffered.tokens[0]
              -- shuffle up the buffer contents
              SEQ i = 0 FOR (output.buffer.size - 1)
                buffered.tokens[i] := buffered.tokens[i+1]
              count := count - 1
              credit := credit - 1
          TRUE -- default option; nothing else to do
            Codes.Out ! NULL
      Send.Fct ? signal -- flow control requested by input buffer
        want.fct := TRUE
      Fct.Seen ? signal -- fct seen by input buffer; adjust credit
        credit := credit + flow.control.batch.size
      waiting.for.token & Data.In ? buffered.tokens[count]
        SEQ
          count := count + 1
          waiting.for.token := FALSE
      ((NOT waiting.for.token) AND (count < output.buffer.size)) & SKIP
        SEQ -- indicate readiness to buffer data
          waiting.for.token := TRUE
          Request.Out ! signal
  :
```

Annex 3

```
PROCEDURE LABELTREE (VAR i, VALUE L, U, N)
VAR j :
BEGIN
  j := i;
  WHILE there are unlabelled terminal links at this node
    BEGIN
      choose an unlabelled terminal link;
      lable it with [i,i+1);
      i := i+1;
    END;
  WHILE there are any unlabelled links at this node
    BEGIN
      choose an unlabelled link K, label it [i, a);
      Let V be the node connected by K;
      LABELTREE (i, K, V, N); -- note that this changes the value of i
      replace a with i;
    END;
  IF L is not terminal THEN -- L will only be terminal when we have finished
    BEGIN
      label L with [0, j);
      IF i <> N THEN label L with [i,N) as well;
    END;
END;
```

TABLE I

| state | Input | Output | Next State |
|---|---|---|---|
| Ready | Flag.r | Set.m2<br>Request<br>Request Data | wait.for.RHG.or.token |
|  | Flag.r | Set.m2<br>Set.s1<br>Request Data | wait.for.header.token |
| wait.for.header.token | Got.token.b | Send.t | wait.for.fifo |
| wait.for.fifo | Got.token.f<br>Full | Request Data<br>Select<br>Request Data | wait.for.header.token<br>wait.for.select.or.token |
| wait.for.select.or.token | Got.EOP<br>Got.token.b<br>Discard<br>Data Wanted | Reset<br>Set.m1<br>Send.h | send.header.then.eop<br>wait.for.select<br>wait.for.header.token<br>send.header.or.get.token |
| wait.for.select | Discard<br>Data Wanted | Reset<br>Set.m1<br>Send.h | clear.buffer<br>send.header |
| clear.buffer |  | Send.t | wait.for.fifo |
| send.header.or.get.token | Got.token.b<br>Data Wanted<br>Empty | Send.h<br>Set.s1<br>Set.m1 | send.header<br>send.header.or.get.token<br>wait.for.request.or.token |

TABLE I-continued

| state | Input | Output | Next State |
|---|---|---|---|
| | Got.EOP | | send.header.then.eop |
| send.header | Data Wanted | Send.h | send.header |
| | Empty | Set.s1<br>Set.m1 | wait.for.request |
| send.header.then.eop | Data Wanted | Send.h | send.header.then.eop |
| | Empty | Set.s1<br>Set.m1 | have.eop |
| wait.for.request.or.token | Got.token.b | | wait.for.request |
| | Data Wanted | | wait.for.token |
| | Got.EOP | | have.eop |
| wait.for.request | Data Wanted | Send.t<br>Request Data | wait.for.request.or.token |
| wait.for.token | Got.token.b | Send.t<br>Request Data | wait.for.request.or.token |
| | Got.EOP | Send.t | Ready |
| have.eop | Data Wanted | Send.t | Ready |
| wait.for.RHG.or.token | Got.token.b | | wait.for.RHG |
| | Got.token.f<br>Full | Request<br>Set.m2 | wait.for.RHG.or.token<br>wait.for.first.token |
| wait.for.RHG | Got.token.f<br>Full | Request<br>Set.m2<br>Set.s1<br>Select | wait.for.RHG<br>wait.for.select |
| wait.for.first.token | Got.token.b | Set.s1<br>Select | wait.for.select |

TABLE II

| state | Input | Output | Next State |
|---|---|---|---|
| Ready | Flag.s | | ready.to.strip1 |
| | Flag.s | | ready.set |
| ready.set | Data Wanted | | wait.for.send |
| | Send | | wait.for.request |
| wait.for.send | send | Request Data | wait.for.tok |
| wait.for.req | Data Wanted | Request Data | wait.for.tok |
| wait.for.tok | Got.token.b | Send.t | wait.for.req |
| | Got.EOP | Send.t<br>Finished | Ready |
| ready.to.strip1 | Send | Request Data | strip.tol.and.req.1 |
| | Data Wanted | | ready.to.strip2 |
| ready.to.strip2 | Send | Request Data | strip.tok.1 |
| strip.tok.and.req1 | Data Wanted | | strip.tok.1 |
| | Got.token.b | Request Data | strip.tok.and.req.2 |
| strip.tok.and.req2 | Data Wanted | | strip.tok.2 |
| | Got.token.b<br>Flag.l | | wait.for.req |
| | Got.token.b<br>Flag.l | Request Data | strip.tok.and.req.3 |
| strip.tok.and.req3 | Data Wanted | | strip.tok.3 |
| | Got.token.b | Request Data | strip.tok.and.req.4 |
| strip.tok.and.req4 | Data Wanted | | strip.tok.4 |
| | Got.token.b | | wait.for.req |
| strip.tok.1 | Got.token.b | Request Data | strip.tok.2 |
| strip.tok.2 | Got.token.b<br>Flag.l | Request Data | wait.for.tok |
| | Got.token.b<br>Flag.l | Request Data | strip.tok.3 |
| strip.tok.3 | Got.token.b | Request Data | strip.tok.4 |
| strip.tok.4 | Got.token.b | Request Data | wait.for.tok |

TABLE III

| state | Input | Output | Next State |
|---|---|---|---|
| off | set | — | on |
| on | set | — | off |

TABLE IV

| state | Input | Output | Next State |
|---|---|---|---|
| wait | ADDR(adr = j) | req | priv |
| wait | ADDR(adr ≠ j) | — | wait |
| priv | — | set | isset |
| isset | — | send | flow |
| flow | finished | set<br>req | wait |

TABLE V

| state | Input | Output | Next State |
|---|---|---|---|
| notpriv | L | R | notpriv |
| | req | R | using |
| using | req | — | priv |
| priv | req | — | using |
| | L | — | notpriv |

What is claimed is:

1. A method of encoding data for transmission in bit sequences in which method each bit sequence contains an equal number of ones and zeros, said sequences being of a predetermined bit length and forming a finite set of permutations of equal numbers of ones and zeros, wherein a first subset of said finite sets is designated for use as data codes and a second subset of said finite set, distinct from said first subset, is designated for use as control codes for controlling transmission of said data codes, wherein said method is used to form message packets comprising at least one data code and an end of packet code which is selected from said second subset and which identifies the end of a packet, wherein each message packet further comprises first and second destination indicators for use in routing said message packet, the first destination indicator identifying an intermediate destination of the message packet at which intermediate destination the first destination indicator is deleted and the second destination indicator identifying a final destination of the message packet.

2. A method of encoding data according to claim 1 when used for the transmission of messages in a network having a plurality of nodes wherein said first destination indicator identifies an intermediate node selected at random from said plurality of nodes.

3. A method of encoding data according to claim 1 when used for the transmission of messages in a network comprising a plurality of interconnected routing switches and wherein said intermediate destination is one of said plurality of routing switches.

4. A method of encoding data according to claim 1 when used for the transmission of message packets in a network comprising a plurality of interconnected routing switches and wherein the final destination indicator is deleted when the message packet is output from one of said plurality of routing switches.

5. A method of encoding data according to claim 1 wherein each sequence has a bit length of six bits and wherein sixteen of said sequences are designated for use as data codes.

6. A method of encoding data as claimed in claim 1 when used to encode messages for routing between a first computer device at a source node and a second computer device at a destination node.

7. A method of encoding data for transmitting messages through a plurality of routing devices in bit sequences in which method the bit sequences are selected from a finite set of twenty bit sequences, each bit sequence having six bits comprising three ones and three zeros, wherein a first subset of said finite set consisting of sixteen bit sequences is designated for use as data codes and a second sub-set of said finite set is designated for use as control codes for controlling transmission of said data codes, said second sub-set consisting of four bit sequences which do not form part of said first subset, wherein a first one of said control codes is designated as a flow control code for controlling the quantity of data codes transmitted between a source device and a destination device;

a second one of said control codes is designated as a null code for maintaining continuous transmission when there is not data code to be transmittal; and a third one of said control codes is designated as an end of packet code which identifies the end of a packet including with said end of packet code at least one data code.

8. A method as claimed in claim 7 wherein each message packet includes a destination indicator identifying the destination of that message packet.

9. A method as claimed in claim 7 wherein each message packet comprises first and second destination indicators for use in routing said message packet, the first destination indicator identifying an intermediate destination of the message packet at which intermediate destination the first destination indicator is deleted and the second destination indicator identifying a final destination of the message packet.

10. A method as claimed in claim 7 when used to encode messages for routing between a first computer device at a source node and a second computer device at a destination node.

* * * * *